Figure 1:
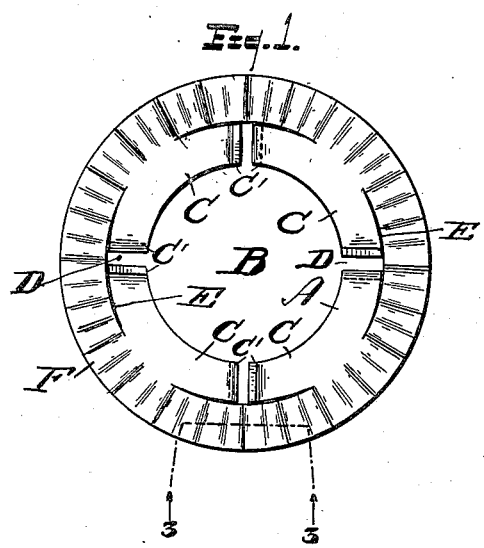

Sept. 20, 1932.   J. J. CONNELL   1,878,827
NUT LOCK WASHER
Filed April 1, 1929

James J. Connell  Inventor
By  S. E. Thomas  Attorney

Patented Sept. 20, 1932

1,878,827

UNITED STATES PATENT OFFICE

JAMES J. CONNELL, OF DETROIT, MICHIGAN, ASSIGNOR, BY MESNE ASSIGNMENTS, TO ALLIED STEEL PRODUCTS CORPORATION, A CORPORATION OF MICHIGAN

NUT LOCK WASHER REISSUED

Application filed April 1, 1929. Serial No. 351,629.

My invention relates to lock washers for nuts, shown in the accompanying drawing and more particularly described in the following specification and claims.

The primary object of this invention is to provide a simple inexpensive lock washer adapted when sleeved upon a bolt to securely hold a nut mounted on the bolt against accidental release when screwed against a frame or other supporting member.

A further object of this invention is to provide a lock washer constructed of sheet metal with a plurality of resilient fingers alternately projecting from opposite sides of the washer to engage the face of a nut and also the surface toward which the nut is adjusted upon a bolt,—the washer having an annular corrugated or crimped surface adjacent its marginal edge to receive the thrust of the nut that it may not flatten the resilient fingers through its adjustment upon the bolt and thereby diminish the gripping action of the washer.

With the foregoing and other objects in view which will appear as the description proceeds, the invention further resides in the combination and arrangement of parts and in the details of construction hereinafter described and claimed, it being understood that changes may be made in the precise embodiment of the invention herein disclosed without departing from the spirit of the same.

Figure 2:
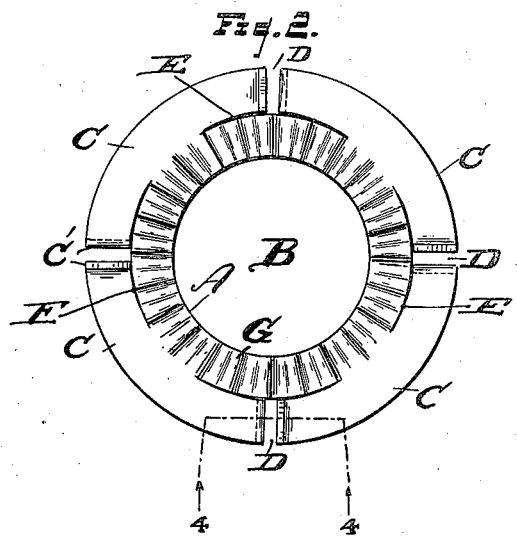
Figure 3:
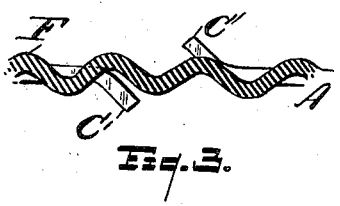
Figure 4:
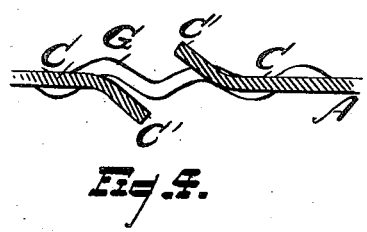

In the drawing accompanying this specification:

Figure 1 is an elevation of a washer.
Figure 2 is a modification of the washer.
Figure 3 is a fragmentary cross-sectional view taken on or about line 3—3 of Figure 1.
Figure 4 is a cross-sectional view of a fragment of the washer taken on or about line 4—4 of Figure 2.

Referring now to the letters of reference placed upon the drawing:

The washer A, is constructed of resilient sheet metal with a central opening B, to receive a bolt,—not shown.

C denotes a plurality of opposing arc-shaped fingers arranged in pairs with their ends $C^1$ $C^1$ bent in opposite directions that they may respectively engage the face of a nut (not shown) screwed upon the bolt and the surface of a machine or other supporting element,—the nut being thus secured against release.

The fingers C are formed out of an annular portion of the body of the washer by radially slitting the washer at spaced intervals as at D,—the radial slits terminating respectively at the intersection of a plurality of arc-shaped slits E concentric to the central opening B in the washer.

As shown in Figure 1, the outer marginal edge or annular portion of the washer is radially corrugated that is, the apices are radial—see F—to receive the thrust of the nut when the latter is adjusted upon the bolt that it may not flatten the fingers C and thus diminish the locking action of the washer and to assist the resilient fingers in securing the nut.

In the modification illustrated in Figure 2, corrugations G are located at the margin or annular portion surrounding the central opening through the washer,—the purpose of the corrugations being the same as those previously described.

The washer is sleeved upon a bolt—not shown—between a nut and the surface of the element supporting the bolt. Upon rotating the nut to tighten it upon the bolt, the chisel-like edges of the device,—extending transversely across the circular path of the nut as it is adjusted,—present a relatively long engaging surface to resist any releasing movement of the nut upon the bolt due to vibration or other cause, other than the forcible manual removal of the nut from the bolt.

By providing a corrugated portion adjacent to the fingers C, all danger of flattening the fingers by a too full adjustment of the nut is prevented, thereby insuring the gripping action of the washer and materially prolonging the life of the device.

Having thus described my invention, what I claim is:

1. A lock washer comprising a sheet metal disk having a central opening therein to receive a bolt, a plurality of concentric annular portions about said opening, rigid radial corrugations in one of said annular portions, resilient prongs extending from another of said annular portions on opposite sides thereof beyond the apices of said corrugations, sharp edges on said prongs adapted to contact with the opposing faces between which the washer is used, the said prong-carrying portion extending substantially midway between opposite apices of said corrugations, thereby permitting said resilient prongs to maintain angularity against the surfaces between which the lock washer is interposed.

2. A lock washer comprising a sheet-metal disk having an opening therein to receive a bolt, an annular portion in said disk having rigid radial corrugations therein, a second annular portion in said disk in a plane substantially midway between the opposing apices of said corrugations, arcuate slits between said radially corrugated portion and said second portion, resilient arcuate fingers formed by radial slits through said second portion terminating at said arcuate slits having sharp edges projecting on opposite sides beyond the apices of said corrugations, thereby permitting said resilient arcuate fingers to maintain angularity against the surfaces between which the lock washer is interposed.

In testimony whereof, I sign this specification.

JAMES J. CONNELL.